Feb. 24, 1942.  H. J. NESS  2,274,209
FURNACE
Filed Sept. 3, 1938   2 Sheets-Sheet 1

INVENTOR
Harold J. Ness
BY
M. J. Reynolds
ATTORNEY

Feb. 24, 1942. H. J. NESS 2,274,209
FURNACE
Filed Sept. 3, 1938 2 Sheets-Sheet 2
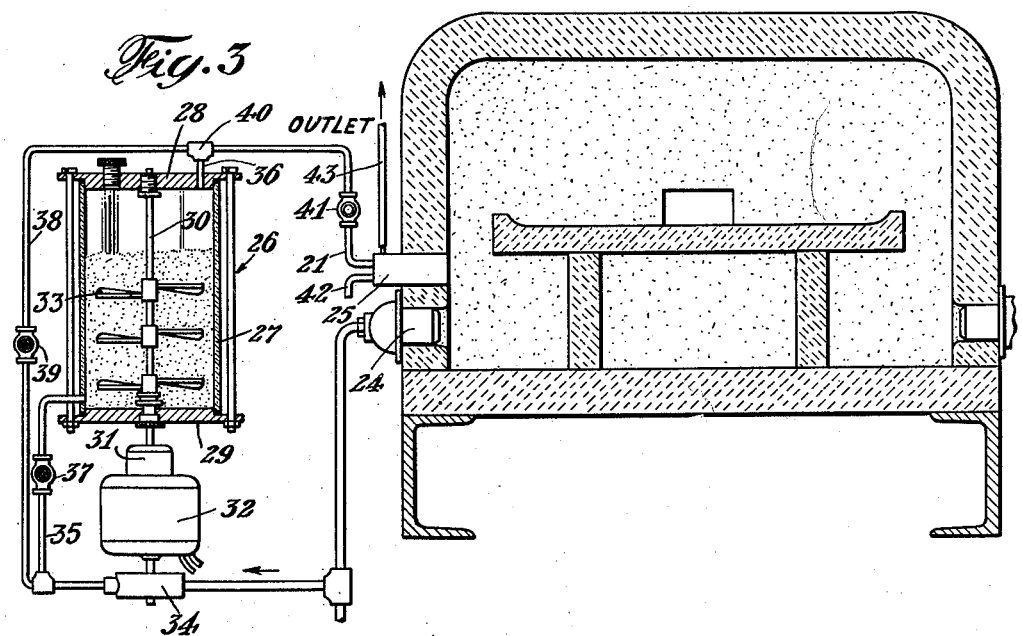
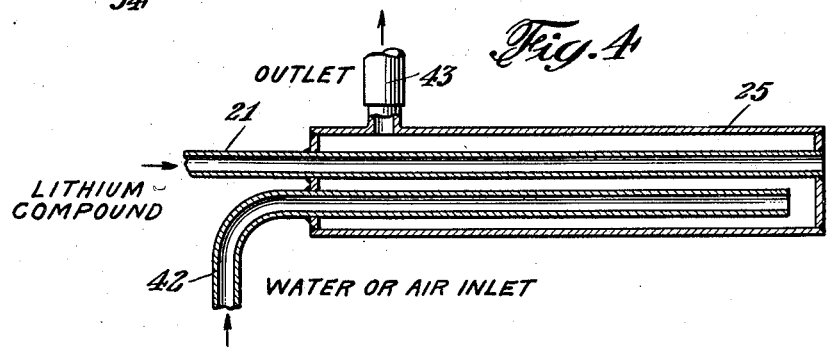
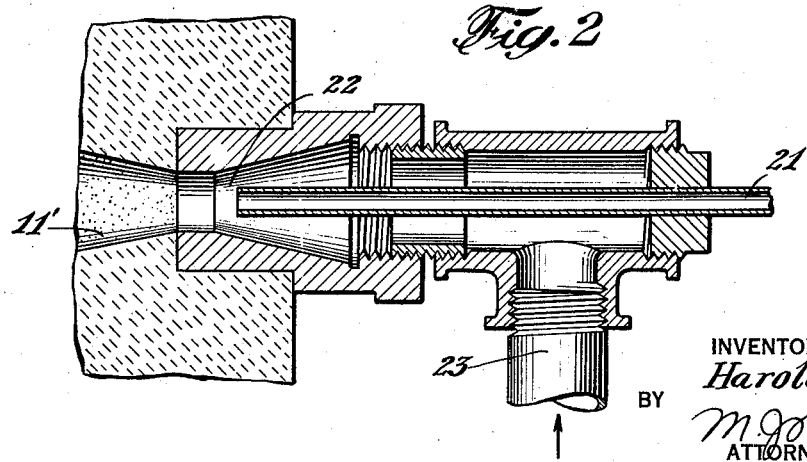
INVENTOR
Harold J. Ness
BY
M. J. Reynolds
ATTORNEY Patented Feb. 24, 1942

2,274,209

UNITED STATES PATENT OFFICE 2,274,209

FURNACE

Harold J. Ness, Bloomfield, N. J.

Application September 3, 1938, Serial No. 228,313

16 Claims. (Cl. 266—5)

This invention relates to furnaces and more particularly to furnaces for the production of lithiated atmospheres, for use in the metallurgy of both ferrous and non-ferrous metals, as for instance, the production of oxygen free metals, such as copper, aluminum, silver, and steel and their alloys, and for heat treatment of metals for mechanical working, normalizing, hardening, etc.

In a copending application Ser. No. 186,941, filed Jan. 26, 1938, now Patent No. 2,181,093, granted Nov. 21, 1939, and entitled "Heat treatment of metals," which application is a continuation in part of still earlier filed applications recited therein, I have disclosed a method of producing a lithiated atmosphere in a furnace, and a furnace in which such atmosphere may be conveniently produced. The present application is a continuation in part of said above mentioned application. Briefly the process comprises the melting of a ferrous or non-ferrous metal or, in the case of solid metals, the heating thereof for treatment or in preparation for mechanical working in an atmosphere containing a vapor of lithium. The lithium is absorbed into molten metal from the atmosphere produced, deoxidizing and also possibly degasifying the same and adding thereto desirable properties. In the case of solid metals, the lithium containing atmosphere serves to deoxidize or partially deoxidize the same and prevents carburization or decarburization of the metal or the formation of oxides on the surface thereof.

The lithium atmosphere is produced in the furnace by introducing a quantity of metallic lithium or a compound of lithium into the furnace, either continuously or at frequent intervals throughout the heating period and providing a supply of carbon monoxide or material from which carbon monoxide may be produced, in the furnace. In the case of furnaces using a carbonaceous fuel, either solid, liquid, or gaseous, the carbon monoxide will be supplied by the products of combustion, but in the case of an electric furnace of the resistance or inductive type, it is necessary to add carbon monoxide or a carbon monoxide forming material to the furnace. In an electric arc furnace, carbon monoxide in sufficient quantity will be generated by combustion of the carbon electrodes.

The lithiated atmosphere may be provided in a gas fired furnace by introducing the powdered lithium compound into the air or gas stream leading into the furnace or it may be injected or blown directly into the furnace through the burner or through an aperture provided in one or more of the furnace walls. In an oil fired furnace the lithium compounds may, if desired, be added directly to the oil, either as an oil soluble compound or in colloidal suspension. In the case of electric furnaces the lithium compounds may be mixed with powdered carbon, such as graphite, and the mixture blown in a fine spray into the furnace, mixed with air or a combustible gas mixture. The lithium compound employed may be the chloride, fluoride, hydroxide, carbonate, etc. of lithium or lithium containing ores, such as spodumene or amblygonite, or mixtures thereof.

The amount of lithium compound required to produce the requisite condition of the furnace atmosphere is very small but is not critical and may be readily determined by experiment for any particular furnace. It should be sufficient to produce a rich scarlet colored flame when the furnace gases in the furnace are viewed with the naked eye. The furnace should be operated on the reducing side, that is, with a slight deficiency of oxygen from that required for complete combustion so that the furnace gases will contain a small percentage of carbon monoxide. The lithium compounds serve in the furnace to promote the formation of carbon dioxide in the furnace gases, with the elimination of free oxygen, either present in the air induced into the furnace or resulting from the dissociation of carbon dioxide or water vapor. When solid metals are placed in the furnace, a compound of lithium, mainly the oxide or carbonate, condenses thereon and forms a protective coating over the surface, protecting the same from any oxidation, carburization, decarburization or other detrimental alteration of the composition or structure of the metal that might otherwise occur. This coating remains on the metal throughout the heating process and the subsequent working and/or cooling of the metal.

One of the objects of the present invention is to provide an improved furnace for conducting metallurgical operations.

Another object is to provide a furnace in which a metallic vapor atmosphere may be conveniently produced and maintained.

Another object is to provide such a furnace which will have a relatively long operating life.

Another object is to provide a furnace for use with a lithium atmosphere in which the lining will be substantially free from deleterious interaction with lithium.

A still further object is to provide such a furnace in combination with means for producing a lithium atmosphere therein.

A still further object is to prevent spalling of the furnace lining and other refractory parts.

Other objects and advantages will hereinafter appear.

There are a number of refractory materials which may be employed in the furnace for such parts as linings, hearths, burner blocks, etc., depending on the temperature to be employed and the nature of the metallurgical operation to be performed, but in the case of some of these materials the life is comparatively short, particularly at higher temperature, due to interaction of the active lithium vapor with the lining materials. For instance, in my copending application Ser. No. 67,547, filed Mar. 6, 1936, now Patent No. 2,181,092, granted Nov. 21, 1939, and entitled "Metallurgical process and apparatus" I have described a lining material composed of silica 65%, alumina 25% and the remainder volatile constituents and small percentages of iron, titanium, lime and magnesium. As stated therein, this material reacts somewhat with lithium, nevertheless it permits a satisfactory lithium atmosphere to be obtained where the furnace temperature is not high and where a particularly rich lithium atmosphere is not required, as in the production of copper-lead alloys or in the deoxidation of such metals as aluminum, zinc, etc. However, the life of such linings is relatively short, particularly at the temperatures employed in the heat treating of ferrous metals. This is apparently due to the fact that the lithium gradually reacts with both the alumina and silica to form lithium aluminates and lithium silicates which are of low melting point. When this condition is reached, the surface of the lining and other refractory parts becomes molten and run or drip at relatively low temperatures and in this condition absorb lithium from the atmosphere at an increased rate, the furnace gases changing from the typical lithium scarlet color to an orange color, indicating a paucity of metallic lithium in the atmosphere.

A fire clay lining somewhat superior to that referred to above consists of hard burned brick of low permeability and low porosity containing approximately 50% silica and 44% alumina, having a bulk density of about 1.2 oz. per cu. inch and a fusion point of about 3200° F. although the life of this lining is also relatively short above 1800° F. Linings or other refractory parts containing sulphur cannot be used, even for minor parts of the furnace, since very small amounts of sulphur in the refractory not only prevents the formation of the lithium atmosphere but poisons the remaining refractories. The refractory should also be free from sodium silicate since the lithium replaces the sodium at the operating furnace temperature to form low melting point lithium silicates.

In order that the refractory shall have a long life and not interfere with the production of the desired lithiated atmosphere condition at elevated temperatures, it should consist of a material resistant to the action of lithium vapor. The chromium oxide lining disclosed in my aforesaid applications has this characteristic. A refractory which is particularly resistant to lithium is magnesium oxide, disclosed in my application Ser. No. 79,968, filed May 15, 1936, and entitled "Metallurgical process." Magnesium oxide and chromium oxide not only are not attacked by lithium but on the contrary are rendered substantially free from spalling. As is well known, heretofore it has been possible to use these materials only in furnaces which are maintained in continuous operation, since on each cooling of the furnace the surface of the refractory spalls or flakes off, so that the entire lining rapidly disintegrates. The presence of lithium vapor in the furnace hardens the chromium oxide and magnesium oxide parts and so strengthens these refractories that they can resist the strain set up on cooling and thus prevent spalling. Consequently, linings composed of either chromium oxide or magnesium oxide, contrary to usual practice, may be employed, in conjunction with the lithium atmosphere, in either continuously or intermittently operated furnaces. Such linings have an increased life in lithiated furnaces whereas most other refractories either entirely prevent the formation of a proper lithium atmosphere or have a very short life. Other refractory materials which may be used are zirconium oxide, zirconium silicate and forsterite ($MgO.SiO_2$), or mixtures of these with each other or with the refractories set forth hereinbefore.

In order that the invention will be more fully understood reference will be had to the accompanying drawings in which:

Fig. 2 is a sectional view of a burner provided with means for introducing the lithium compound into the flame;

Fig. 3 is a vertical section of a hearth type furnace with a modified apparatus for introducing lithium compound thereinto adjacent the burner;

Fig. 4 is a sectional view of the nozzle of Fig. 3;

Figure 1:
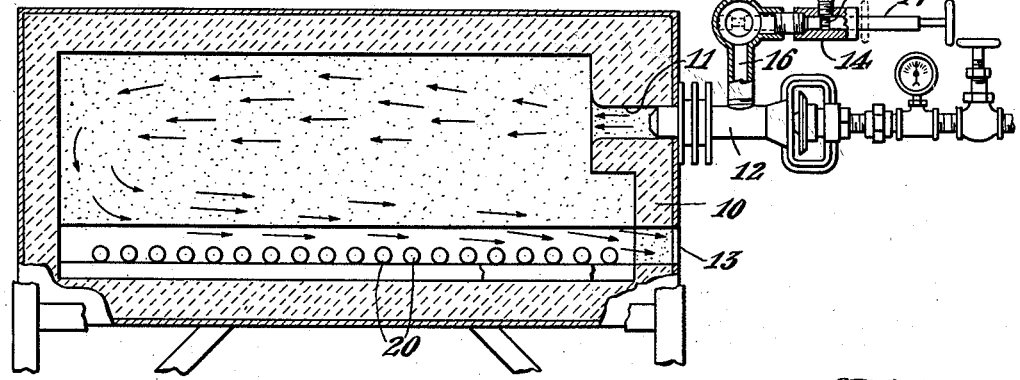
Fig. 1 is a vertical sectional view of a forging furnace with associated apparatus for producing a lithium atmosphere therein.

Referring first to Fig. 1, I have shown a furnace of the conventional forging type having a refractory lining 10, an opening or tunnel 11 for the burners 12 and outlets 13 for the gases. The lining 10 and other refractory parts of the furnace are preferably composed of a material such as chromium oxide or magnesium oxide, which is neutral or basic to lithium. In general, cellular insulating brick or moulded or tamped-in linings have not been as satisfactory as lining built up from hard burned refractories or chemically bonded pressed refractories, apparently due to the high permeability thereof or the reaction of the lithium or one of its compounds with the binder employed in such moulded linings. Linings, hearths and other refractory parts of the furnace may be composed of or contain silicon carbide providing the sulphur containing compounds usually employed in the binder of silicon carbide refractories are eliminated.

The lining 10 may be preconditioned, if desired, by introducing lithium or a compound thereof into the furnace while the furnace is at an elevated temperature, for a period of several hours. Thereafter the furnace may be used for successive heats by introducing lithium metal or compounds into the furnace either continuously or at such periods as necessary to maintain the requisite lithium atmosphere in the furnace.

I may introduce the lithium metal or compound into the furnace mixed with the air or fuel since this insures that it will pass through the hottest part of the flame, which is at a temperature several hundred degrees above the average furnace temperature. Hence the lithium or its compound will be more readily converted into a vapor.

I have shown means for introducing measured amounts of lithium metal or compound into the furnace, comprising a sleeve 14 threaded into an elbow 15 in the air intake 16. A piston 17 slidable in the sleeve 14 is provided with an annular recess 18 adapted in the retracted position of the piston to be positioned beneath a hopper 19, containing oil-coated comminuted lithium metal or powdered compounds thereof, so as to receive a charge thereof and to convey the same into the air and gas line when the piston is moved inwardly. The charge thus introduced into the air and gas mixture is carried by the same into the furnace whereupon, as stated, it passes through the hottest part of the flame. The piston may be operated manually from time to time throughout the process as determined by experience or an inspection of the gases escaping from the furnace, or if desired, the plunger may be reciprocated by a continuously operating crank or other means, not shown, so as to supply the lithium in definitely timed increments.

The metal bars 20 being heated are shown positioned on the floor of the furnace remote from the burners and at a place where the combustion is completed so that no combustion can occur on the surface of the metal. The vapor produced by the lithium, with proper design and location of the various parts, as hereinafter appears, will pervade the entire furnace and prevent both carburization and decarburization of the metal and the formation of oxide scale on the surface of the parts being heated.

The flame should preferably not impinge directly on the refractory, particularly in furnaces operated at high temperature. I prefer to have the combustion substantially completed in the burner tunnel and for that reason the tunnel 11 is made relatively long. In the embodiment shown the burner 12 is directed, as indicated, to the rear of the furnace, the products of combustion being reflected by the rear wall towards the front outlets 13.

It is important that the distribution of the lithium vapor be uniform throughout those portions of the furnace in which the metal to be heated resides or passes. This uniform distribution of the lithium vapor is dependent upon a number of factors but largely upon the position and relationship of the burners to the outlet parts. The arrangement should be such as to avoid a straight flow of the furnace gases from the burners to the outlet ports and preferably so as to obtain a turbulence within the furnace. The size and position of the outlet ports should be such as to cause a slight pressure to be created within the combustion and heating chambers. In general, a furnace having an arched roof with the burners directed upward at a slight angle is preferred but is not essential to uniform distribution of the lithium. The flame should not impinge upon the work or be so disposed relative thereto as to permit of surface combustion on the work. I prefer to employ short flame burners disposed in relatively long burner tunnels, as shown at 11 in Fig. 1, so that the combustion is substantially completed within the tunnel. For this reason a larger number of small burners is preferable to a lesser number of large burners.

The lithium compound may be introduced through the burner or adjacent thereto. Preferably I place the lithium compound inlet in the burner itself rather than as shown in Fig. 1 in the air or gas stream leading to the burner, and in Fig. 2 such preferred arrangement is shown. In the modification shown in Fig. 2 the lithium compound in a powdered and atomized form is introduced into the burner through a tube 21, preferably being conveyed through the tube 21 by a combustible mixture of air and gas of the same proportion as supplied to the burner. The tube 21 terminates at the throat of the burner nozzle 22 and is drawn by the suction produced at the point of termination thereof, into the fuel stream. As indicated by the legend, the fuel mixture, either gas and air or oil and air enters at the inlet 23. Combustion of the fuel occurs in the burner tunnel 11' which may flare outwardly, as shown. By directing the lithium into the burner in a straight conduit, free from bends or pockets, and disposing the end of the conduit in the throat of the burner, accumulation of the compound in the conduit or in the burner, and consequent clogging thereof, is prevented.

Figure 5:
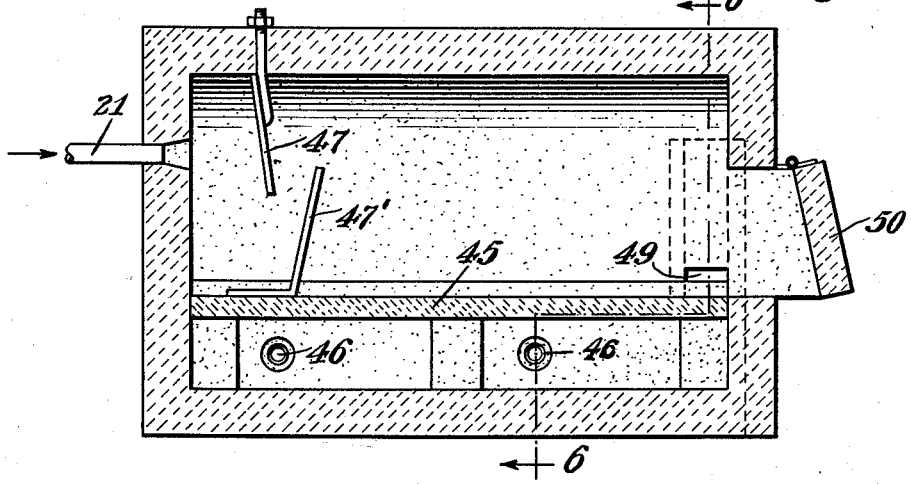
Fig. 5 is a vertical sectional view of a modified hearth type furnace having the lithium compound inlet disposed above the hearth.

It is not necessary, however, that the lithium compound be introduced into the burner. If desired, the lithium compound conduit may be disposed over the burner as shown in Fig. 3, so that the atomized powder tends to fall into the flame or into the gases adjacent the burner. Or it may even be somewhat remote from the burners. For instance, in a hearth type furnace in which the burners are beneath the hearth, a uniform distribution of the lithium vapor over the hearth may be obtained by introducing the lithium compound above the hearth, as shown in Fig. 5.

In the case of furnaces having a large heating chamber, it may be desirable to supply the lithium compound at a number of spaced points about the furnace although it is not ordinarily necessary to provide a lithium compound supply for each burner. The distribution of the lithium atmosphere can be determined by employing test pieces, preferably a number of iron rods or bars set upright, throughout the furnace. In those parts of the furnace not adequately supplied with the lithium vapor, the rods will be oxidized or scaled. Rearrangement of the burners, outlet ports or lithium compound inlets can be made based on such tests until a uniform distribution of the lithium vapor over the entire working portion of the furnace is obtained.

In Fig. 3 I have shown a furnace of the hearth type in which the lithium conduit 21 is placed directly above the burner 24. The terminal of the conduit 21 is shown provided with a cooling jacket 25 through which air or water or other cooling fluid may be circulated. A supply of lithium carbonate or other powdered compound of lithium may be provided by an atomizing device of the form shown in either of my copending applications Ser. No. 143,410, filed May 19, 1937, and entitled "Injecting apparatus" and Ser. No. 209,885, filed May 25, 1938, and entitled "Atomizing device for pulverulent material." In Fig. 3 I have shown an atomizing apparatus of the general type disclosed in said copending applications, comprising a container 26 consisting of a cylindrical tube 27, preferably of glass, having flanged upper and lower closure members 28 and 29 respectively, clamped against the ends of the tube 27 in any suitable manner, with interposed gaskets. Extending axially through the container 26 is a shaft 30, journaled in the closure members 28 and 29. The shaft 30 is driven through suitable reducing gears 31 by a motor 32. Mounted upon the shaft 30 are several sets of blades 33, adapted to agitate the powdered lithium compound which is contained in the chamber 26. A combustible mixture of air and gas under pressure is supplied by a blower 34 also driven by the motor 32, the air and gas mixture being conducted by a tube 35, into the lower wall of the container 26 and passing out of the container laden with the powdered compound, through the conduit 21, extending into the furnace.

A valve 37 controls the flow of the air and gas into the chamber 26 and consequently the amount of lithium compound blown into the furnace.

I bypass a part of the air and gas mixture from the blower 34 through a conduit 38, provided with a suitable regulating valve 39. The air and gas mixture flowing in conduit 38 is conducted through a Venturi tube 40, disposed adjacent the outlet 36 of the container 26, so as to assist in the withdrawal of the compound laden air and gas from said container. The additional air and gas provided through the conduit 38 serves to maintain the terminal of the conduit 21 cool and also, due to pressure with which it is supplied serves to blow the powdered compound through the conduit at such speed that fusing thereof to the wall of the tube adjacent its tip is prevented. By supplying a gas and air mixture to the blower, the ratio of gas and air in the furnace is not disturbed by the fluid medium employed to convey the powders into the furnace. A flame arresting valve 41 may be included in the line extending into the furnace to prevent back flash through the line. In place of the mixture of air and gas, either air alone or gas alone may be employed to convey the powdered compound into the furnace, although the use of air alone tends to create localized hot zones in the furnace and somewhat detracts from the efficiency of the action of the lithium compound in such zones. Excessive moisture in the air, such as results from high compression of the same, or in the gas employed, also detrimentally affects the action of the lithium compound and the maintenance of the proper lithiated atmosphere within the furnace, and should be avoided. The inlet should preferably be located relative to the parts to be heated so that the lithium compound stream does not impinge directly on such parts but has an opportunity to diffuse somewhat, particularly when air is used as the inspirating or carrying medium.

In Fig. 4 I have shown a sectional view of the terminal of the conduit 21 and cooling jacket 25. The cooling fluid enters the jacket through a conduit 42 extending from any suitable source of air under pressure, and exhausts through the outlet pipe 43. In place of air, water or other cooling fluid may be employed.

In carrying out the present process the furnace is brought up to heat and the motor 32 started. The valve 37 is then opened to permit the inspirating medium to pass through the chamber 26. In so doing it picks up some of the powdered lithium compound carrying it into the furnace. Under the conditions prevailing in the furnace the compound, or at least a portion thereof, breaks down liberating free metallic lithium. The reaction is apparently first the formation of lithium oxide which reacts with carbon monoxide as follows: $2Li_2O + CO = Li_2CO_3 + 2Li$.

The lithium is thus freed to combine with the oxygen of the furnace or of the metal being heated and the lithium carbonate of the above reaction is again broken down to lithium oxide liberating carbon dioxide. The reaction is then repeated with the lithium oxide so formed.

The valve 37 should be adjusted so as to cause a sufficient flow of the lithium compound into the furnace, to produce a rich lithium color in the furnace gases. The amount of the compound required varies with the compound used, the type and construction of the furnace, the location therein of the metal to be heated and the temperature attained in the furnace. The amount of any particular lithium compound to be used, in order to provide the desired protective coating, and lithiated atmosphere can be readily determined by making one or more test heats or the metal being heated can be observed as the heating continues to determine if a proper coating is forming thereon. In certain furnaces fired with artificial gas excellent results have been obtained with the use of as little as about 0.003 ounce of lithium carbonate per cubic foot of gas but the amount required is not critical and may vary either side of the figure mentioned. Equivalent amounts are required in oil burning furnaces for equal heat generation. When the proper lithium condition is obtained in the furnace, the metal to be heated is introduced therein. If desired, the metal to be heated may be placed on a traveling conveyor and passed through the furnace at such rate as to complete the heating or heat treatment during its passage therethrough. The furnace may be opened freely during the process, for the introduction or removal of parts, or it may be left open continuously in a properly designed furnace, if desired, without danger of oxidation of the parts.

The presence of the lithium metal vapor in the furnace gases permits the heating to be carried out without the use of protective muffles, and directly in the furnace gases irrespective of the usual carbon dioxide or water vapor content thereof without scaling, carburization, decarburization or other detrimental effect on the metal parts being heated. Furthermore, as stated, there is a condensation of the lithium or lithium compounds which forms very quickly on the parts and which physically protects the surfaces thereof from any contaminating or oxidizing influence of the furnace atmosphere. As a result of this protective coating high carbon steels and steels of various carbon content or alloy constituents may be heated simultaneously in the same atmosphere, that is, in the same furnace load, without adjustment or compensation for the composition of the individual parts, without decarburization, and alloy steels, including aluminum containing steels may be heated without deleteriously altering the composition thereof. The coating deposits apparently either as an oxide or a carbonate of lithium or both and adheres to the parts throughout the heat treatment and after removal from the furnace, so that when the heating is complete the parts may be immediately removed from the furnace and worked or cooled in the air. Upon cooling the coating appears to be mostly the carbonate of lithium.

The valve 37 is kept open or partially open throughout the process so as to supply the lithium compound continuously to the furnace during the heating but, of course, if desired, the amount of compound may be varied as the heating continues.

Figure 6:
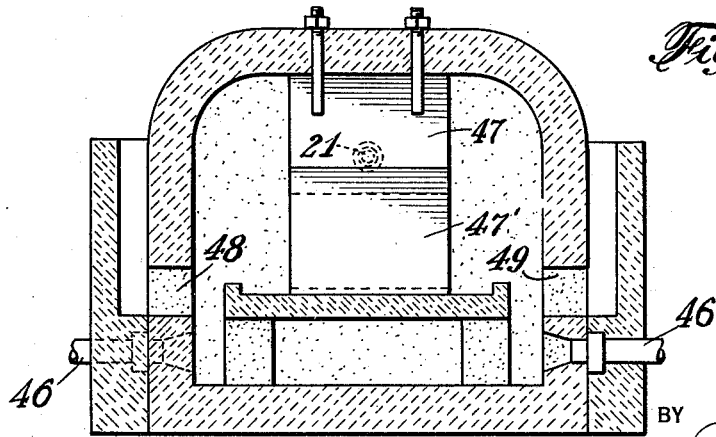
Fig. 6 is a sectional view on the line VI—VI of Fig. 5.

The furnace shown in Figs. 5 and 6 is generally like that of Fig. 3 except that the lithium compound inlet 21 is disposed well above the hearth 45 and at right angles to the burners 46 so as to direct the atomized compound stream lengthwise of the furnace. A baffle 47 suspended from the furnace arch and a second baffle 47' staggered with respect thereto and supported on the hearth 45, serve to break up the compound stream and to disperse the same in the furnace gases as they turbulate upwardly around the sides and over the hearth. The baffles 47 and 47' extend only part way towards each of the furnace walls and hearth and hence the lithium compound or vapor passes both between and around the baffles. The outlet ports 48 and 49 are located in the side walls of the furnace near the opposite end of the furnace from the inlet 21 and at a lower level. There is, therefore, no direct draft through the furnace but instead a turbulent upward movement of the furnace gases along the walls, and roof and a central downward deflection thereof on the hearth so that both the products of combustion and the lithium vapor produced therein pass in a tortuous or indirect path from the inlets to the outlet ports. The outlet ports are sufficiently restricted to cause a slight pressure in the furnace and to prevent a too direct egress of the furnace gases. It is to be understood, however, that the door 50 may be opened for loading or unloading of the furnace or for inspection without causing loss of the effectiveness of the atmosphere. It will be noted that the door is located relative to the inlet ports so that the lithium vapor must pass across the face of the hearth in its movement toward the door.

It is to be further understood that the types of furnaces shown have been by way of example only and that any type of furnace may be provided with the lithium atmosphere if the proper lining is employed and the other features above noted are observed. In my application Ser. No. 67,547, filed Mar. 6, 1936, I have shown both gas fired and electric induction melting furnaces of the lithiated type and in my application Ser. No. 143,411, filed May 19, 1937, I have shown a lithiated electric furnace of the resistance type.

I do not desire to be limited, therefore, to the particular types of furnaces shown.

When preheaters, regenerators, etc. heated by the exhaust gases are used, it is essential that the refractory parts thereof be of the same material suitable for use for the furnace refractory.

What I claim is:

1. A metallurgical furnace for the heating of metals comprising a refractory lining composed largely of magnesium oxide, a burner for said furnace and means for introducing a pulverulent compound of lithium in predetermined amounts into said furnace through said burner.

2. A metallurgical furnace for the heating of metals comprising a refractory lining composed largely of chromium oxide, a burner for said furnace, and means for introducing a lithium compound into the furnace through said burner at a predetermined rate.

3. A metallurgical furnace for the heating of metals comprising a refractory lining which is neutral or basic to the action of lithium vapor at elevated temperatures, means for admitting a gaseous atmosphere into said furnace and means for introducing a pulverulent lithium compound into said atmosphere prior to the admission of the same into the furnace.

4. A metallurgical furnace for the heating of metals comprising a combustion chamber, a burner extending into said combustion chamber for producing combustion of a carbon containing fuel in a portion thereof adjacent said burner and means for introducing a stream of a lithium compound into said portion of the combustion chamber.

5. In a furnace, the combination of a heating chamber, a lining therefor composed of a refractory material which is neutral or basic to lithium at the operating temperature of the furnace, means for introducing or generating carbon monoxide in said chamber and means for introducing a pulverulent compound of lithium into said chamber in the region of maximum temperature of said carbon monoxide.

6. In a furnace, the combination of a heating chamber, a lining therefor composed of a refractory material which is neutral or basic to alkali metals, means for introducing or generating carbon monoxide in said chamber, and means for introducing an alkali metal or compound into said chamber at the point of maximum temperature thereof.

7. In a furnace, the combination of a heating chamber, a lining therefor composed of a refractory material which is neutral or basic to alkali metals, means for introducing or generating carbon monoxide in said chamber, means for introducing an alkali or alkaline earth metal or compound into said chamber in an atomized stream and means for substantially uniformly dispersing said metal or compound in the said chamber.

8. In a furnace, the combination of a heating chamber, a lining therefor which is neutral or basic to lithium, and means for obtaining a gaseous atmosphere in said chamber containing carbon monoxide and lithium vapor.

9. In a furnace, the combination of a heating chamber, a hearth in said chamber, the lining of said furnace and said hearth being composed of refractory material neutral or basic to lithium, means for introducing a combustible carbon containing fuel beneath said hearth, and means for introducing a lithium compound above said hearth.

10. In a furnace, the combination of a heating chamber, a hearth in said chamber, the lining of said furnace and said hearth being composed of refractory material neutral or basic to lithium, means for introducing a combustible carbon containing fuel beneath said hearth, means for introducing a lithium compound above said hearth, and baffle means for causing dispersion of the compound in said chamber.

11. In a furnace, the combination of a heating chamber, a lining therefor which is neutral or basic to lithium, means for obtaining a gaseous atmosphere in said chamber containing carbon monoxide, a conduit extending into said furnace, cooling means for said conduit and means for conducting a compound of lithium through said conduit.

12. In a furnace, the combination of a heating chamber, a refractory lining for said chamber neutral or basic to lithium, a burner for said furnace, a conduit extending into said burner and means for introducing an alkali or alkaline earth metal or compound into said conduit.

13. In a furnace, a heating chamber, a refractory lining therefor neutral or basic to lithium, inlet means for a combustible mixture, means for introducing a powdered compound of lithium into said inlet, outlet ports for said furnace, said ports being so disposed relative to said inlet means and so proportioned as to preclude a direct flow of the products of combustion through said heating chamber.

14. A furnace comprising a heating chamber, a carbonaceous fuel burner, a refractory tunnel for said burner communication with said heating chamber, said tunnel being of a length sufficient to permit substantially complete ignition of the fuel in said tunnel and means for introducing lithium or a compound of lithium into said tunnel.

15. In a furnace, the combination of a heating chamber, a lining therefor consisting of a refractory which is resistant to the disintegrating effect of lithium vapor at the operating temperature of said furnace, means for introducing combustion gases into the furnace and means for introducing a fine stream of a powdered alkali metal compound into said combustion gases.

16. A metallurgical furnace for the heating of metals comprising a refractory lining composed largely of a material of the group consisting of magnesium oxide and chromium oxide, a burner for said furnace and means for introducing a compound of lithium in predetermined amounts into said furnace, through said burner.

HAROLD J. NESS.